United States Patent
Chintala et al.

[19]

[11] Patent Number: 6,157,717
[45] Date of Patent: Dec. 5, 2000

[54] SNAP HINGE MECHANISM FOR FLIP STYLE PORTABLE PHONE

[75] Inventors: Thomas J. Chintala; Jose F. Olivas, both of San Diego, Calif.; Martin J. Kimbell, Round Lake Beach; Miguel A. Cano, Jr., Schaumburg, both of Ill.

[73] Assignee: Qualcomm Incorporated, San Diego, Calif.

[21] Appl. No.: 09/045,153

[22] Filed: Mar. 19, 1998

[51] Int. Cl.[7] .................................................. H04M 1/00
[52] U.S. Cl. ............................................................ 379/433
[58] Field of Search .................................. 379/433, 428; 455/575, 90; 16/2, 342, 335

[56] References Cited

U.S. PATENT DOCUMENTS

| | | | |
|---|---|---|---|
| 5,111,503 | 5/1992 | Takagi | 379/433 |
| 5,257,310 | 10/1993 | Takagi et al. | 379/433 |
| 5,507,013 | 4/1996 | Weadon et al. | 455/90 |
| 5,640,690 | 6/1997 | Kudrna | 455/89 |
| 5,649,309 | 7/1997 | Wilcox et al. | 455/90 |
| 5,651,063 | 7/1997 | Ji et al. | 379/433 |
| 5,661,797 | 8/1997 | Leman et al. | 379/433 |

FOREIGN PATENT DOCUMENTS 0801489  3/1997  European Pat. Off. ......... H04M 1/02

*Primary Examiner*—Jack Chiang
*Attorney, Agent, or Firm*—Philip R. Wadsworth; Charles D. Brown; Roger W. Martin

[57] ABSTRACT

A snap hinge assembly for rotatably connecting a flip cover to a portable phone housing has only two parts, a hinge pin and a spring. The hinge pin is rotatably mounted in the housing and secured to the cover so as to rotate with the cover as it is opened and closed, and has a cam portion for engaging the spring. The spring is anchored in the housing and has a bearing portion for bearing against the cam portion as the pin rotates with the cover. The shape of the cam portion is such that the bearing portion is resiliently biased as the hinge pin rotates, and released at a predetermined orientation so as to snap the cover into either the open or closed position, depending on the direction of rotation of the pin. The cover is held by the engaging spring and cam surfaces in the open or closed position until positively urged towards the opposite end position.

22 Claims, 5 Drawing Sheets

SNAP HINGE MECHANISM FOR FLIP STYLE PORTABLE PHONE

BACKGROUND OF THE INVENTION

The present invention relates generally to portable phones with a hinged lid or cover which is opened when the phone is to be used, and is particularly concerned with the hinge mechanism for such phones.

Existing portable phone hinges comprise several complex pieces of metal and plastic which must be assembled properly during manufacture, adding to the cost and difficulty of portable phone manufacture. Due to the complexity, such hinges are also susceptible to malfunction and potential breakage.

SUMMARY OF THE INVENTION

It is an object of the present invention to provide a new and improved hinge mechanism for a portable phone.

According to the present invention, a portable phone is provided which comprises a front housing having a keypad, the housing having a first end and a second end, a cover hinged to the second end of the housing for movement between a closed position covering at least part of the keypad and an open position, and a hinge mechanism connecting the cover to the second end of the housing, the hinge mechanism comprising a hinge pin rotatably mounted in the second end of the housing and secured to the cover, and a spring member secured in the second end of the housing and bearing against the hinge pin to urge the cover into the open position as the cover is rotated towards the open position, and to urge the cover into the closed position as the cover is rotated towards the closed position.

Preferably, the hinge pin has at least one pair of opposing flat faces, one of the flat faces opposing the spring in the open position of the cover, and the other flat face opposing the spring in the closed position of the cover. The pin is arranged to compress or urge the spring away from its normal, unbiased position as the cover is opened or closed and the pin is rotated in opposite directions, so that the spring will urge the pin into the open or closed position, respectively.

The hinge mechanism of this invention is very simple, comprising only two parts, and is easy to install in a portable phone. The hinge pin preferably has enlarged opposite end portions for rotatable engagement in opposing openings at the second end of the phone housing, and key members at the end of each enlarged end portion for engagement in matching, opposed key openings in a pair of ears on the cover.

Preferably, two spaced cam portions of the hinge pin have opposing flats for bearing against the spring in the open and closed positions of the cover. A first one of the flats corresponds to a predetermined open angle of the cover relative to the housing, while the second flat corresponds to the closed position. The spring is preferably a leaf spring of a shallow, wave-like or w-configuration, with a central curved portion for fitting around part of a cylindrical boss in the housing facing the hinge pin, a pair of curved portions on opposite sides of the central portion which curve away from the hinge pin and then back towards the respective spaced portions of the hinge, the outer ends bearing against the spaced cam portions. The spaced cam portions are preferably adjacent the enlarged end portions of the hinge pin, and a central, reduced diameter shaft portion extends between the cam portions.

The operation of the hinge mechanism is simple and reliable. When the cover is closed, a flat on the respective cam portion bears against the respective curved end of the spring. As the cover is moved or rotated about the hinge axis towards the open position, the flat rotates away from the spring and the outer edge of the cam portion presses the spring outwardly away from the hinge pin, increasing the biasing force of the spring against the cam portion. As the hinge pin rotates further, the outer edge of the cam portion will move over the spring. As it is rotated past the spring towards the opposing flat, the spring will eventually force the hinge pin to snap the cover open, with the spring end portions resting against the second flats of the cam portions. As the cover is rotated back towards the closed position, the same basic operation takes place, with the edge of the cam portions first pressing the spring end portions outwardly and increasing the biasing force, and the spring end portions forcing the hinge to snap the cover back into the closed position when the edge portions clear the spring. The hinge mechanism therefore provides some resistance against initial opening or closing of the cover, so that the cover is held in the open or closed position unless positively urged towards the respective closed or open position. Additionally, the hinge mechanism causes the cover to snap automatically into the correct open orientation once the cover is rotated through a predetermined angle, and similarly causes the cover to snap automatically into a closed position if rotated towards the housing. This provides a comfortable and reliable "feel" to the hinge, and ensures that the cover is held securely in a closed position unless the user wishes to open it. The cover is also securely held in its open position until the user closes it.

The hinge mechanism of this invention is simpler and less expensive than prior art portable phone hinges. Since it involves only two moving parts, it is significantly easier to install and less liable to malfunction. The hinge is designed to hold the cover in a closed position unless the user positively urges it open, and to automatically snap the cover into a preferred open orientation if the user rotates the cover beyond a predetermined open angle. Similarly, the cover is held open unless positively pushed closed. This provides a reliable cover and hinge which is convenient both to manufacture and use.

BRIEF DESCRIPTION OF THE DRAWINGS

The present invention will be better understood from the following detailed description of some preferred embodiments of the present invention, taken in conjunction with the accompanying drawings, in which like reference numerals refer to like parts, and in which.

DESCRIPTION OF THE PREFERRED EMBODIMENTS

Figure 1:
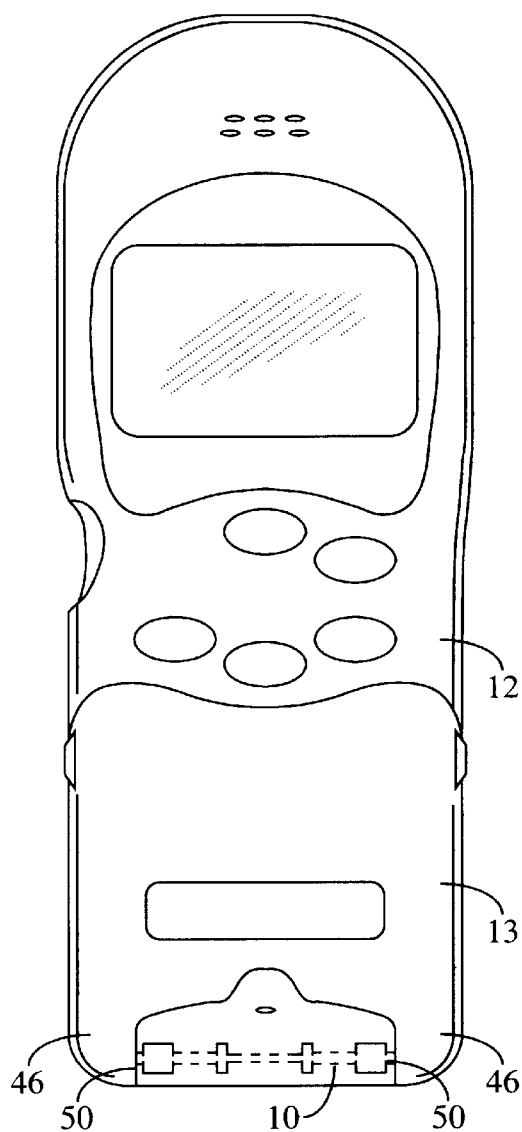
FIG. 1 is a front view of the front housing of a portable phone incorporating the snap hinge mechanism according to a preferred embodiment of the invention.
Figure 2:
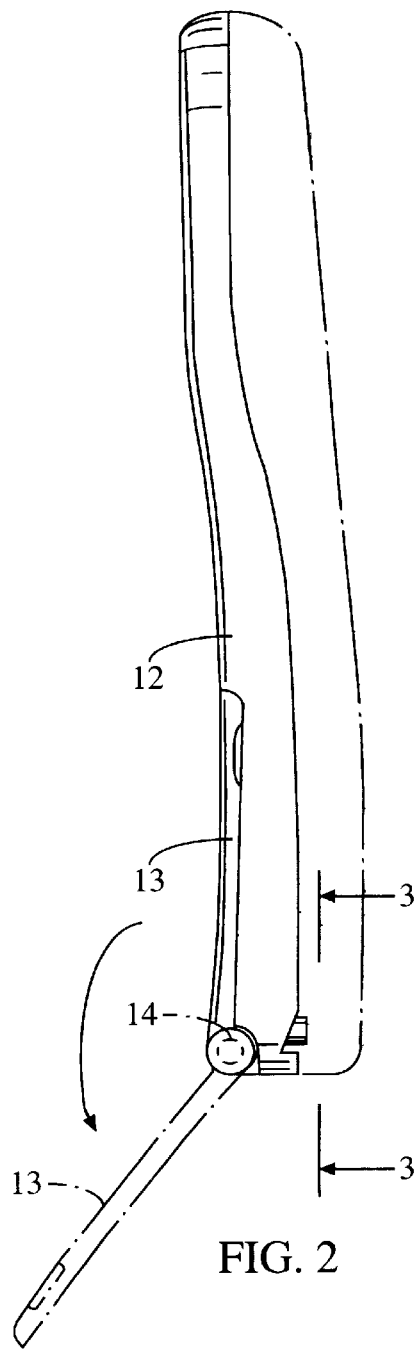
FIG. 2 is a side elevation view of the housing showing the open and closed positions of the flip cover.

FIGS. 1 to 7 of the drawings illustrate a snap hinge mechanism 10 according to a first embodiment of the present invention installed in the front housing 12 of a portable phone between the housing and a flip or cover 13 of the phone. The hinge mechanism 10 is illustrated in more detail separate from the phone in FIG. 8. As illustrated in FIG. 8, the hinge mechanism 10 basically comprises a hinge pin or cam shaft 14 and a leaf or strip spring member 16. Optionally, protective covers or clips 18 may be provided for protecting the cam surfaces of pin or shaft 14 against excessive wear.

Cam or hinge shaft 14 has enlarged end portions 20 and a key tab 26 projects from the outer end of each end portion 20. A cam portion 28 having opposing flat surfaces 30 and rounded outer edges 32 is provided adjacent each end portion 20, as best illustrated in FIGS. 4 and 8. The clips 18 are designed to slide over the respective cam portions 28 from one side to cover the flat surfaces 30 and one side edge 32. A reduced diameter central shaft portion 34 extends between the cam portions 28, and is separated from the cam portions by enlarged annular flanges 36.

The leaf spring member 16 is of any suitable material such as beryllium copper alloy, and is illustrated in detail in FIG. 8. It comprises a thin metal strip of shallow, undulating or generally w-shape with a central portion 38 curved in a first direction, curved portions 40 adjacent each side of the central portion which are curved in the opposite direction to the central portion, and a short, curved bearing portion 42 at each end which curves in the opposite direction to the portions 40 and which is intended to bear against the respective cam portion 28 of the cam or hinge shaft 14, as illustrated in FIGS. 3, 4, 5 and 6.

Figure 7:
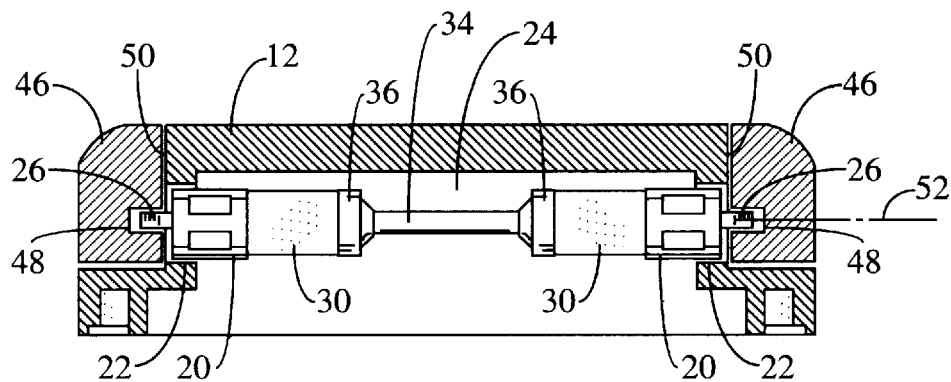
FIG. 7 is a sectional view taken on line 7—7 of FIG. 3.
Figure 8:
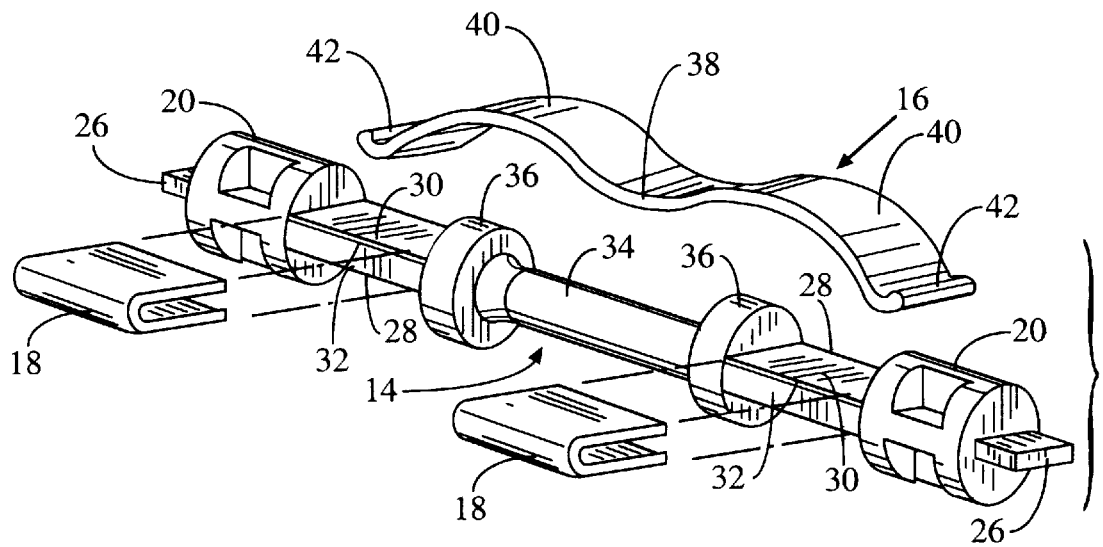
FIG. 8 is a perspective view of the cam and spring elements, with optional cam reinforcing clips.

The housing 12 has a recess or chamber 24 at the hinged end for receiving the hinge shaft 14, with opposite end walls 50 over which a pair of ears 46 on the cover 13 engage, as best illustrated in FIG. 7. The enlarged end portions 20 on the shaft extend through openings 22 in the opposite end walls 50 of the recess with sufficient clearance to allow the shaft to rotate relative to the housing end walls. The key tabs 26 project outwardly from the openings 22 for engagement in corresponding key slots 48 in the respective ears 46, so that the shaft 14 is rotated about its axis as the cover is opened and closed.

Figure 3:
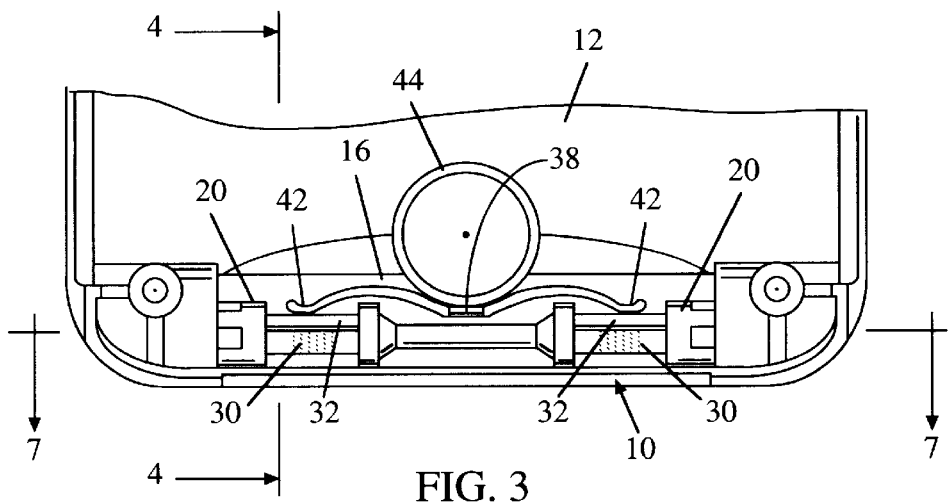
FIG. 3 is an enlarged view taken in the direction of arrows 3—3 in FIG. 2, with the cover closed.
Figure 5:
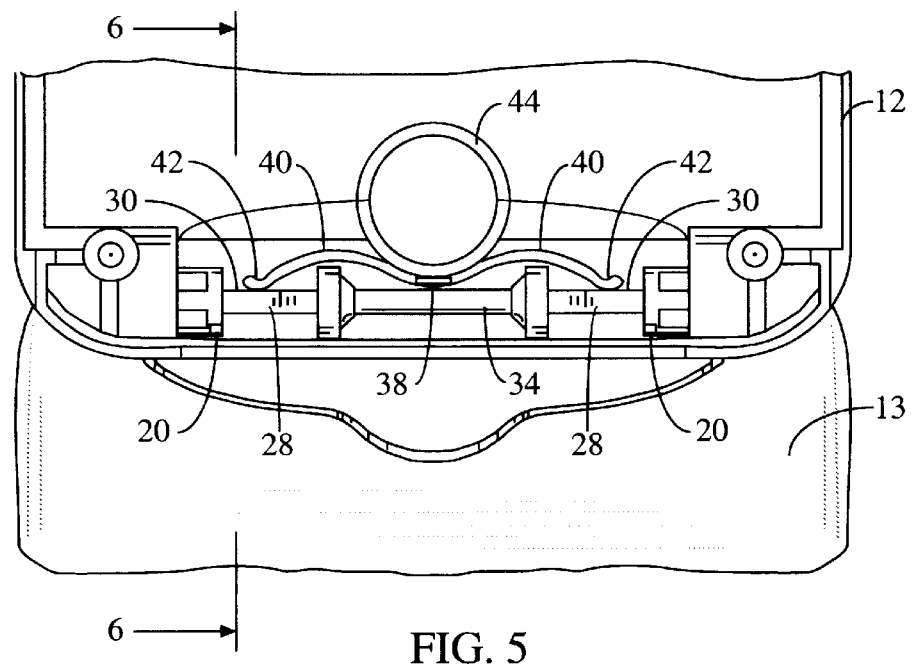
FIG. 5 is a view similar to FIG. 3, but with the cover open.

The central portion 38 of spring member 16 is anchored to a cylindrical boss 44 in the housing, with the concave sides of curved portions 40 facing towards the cam shaft 14, as best illustrated in FIGS. 3 and 5. The end bearing portions 42 of the spring member bear against the respective cam portions 28 of the shaft. FIG. 5 illustrates an end position of the spring, in which portions 42 each bear against a flat surface 30 of the respective cam portion. FIG. 3 illustrates a more stressed or deflected condition, in which the cam shaft is rotated such that the side edge 32 of the respective cam portion pushes the bearing portion 42 in a direction away from the cam shaft, stressing the opposite ends of the spring.

Operation of the snap hinge assembly will now be described in more detail with reference to FIGS. 2 to 7. The cam portions of the hinge shaft define regions of varying height or distance from the rotation axis 52 of the shaft. The flat surfaces 30 are at a relatively short distance from the rotation axis 52, while the side edges 32 are at a much larger distance from the rotation axis. When the cover is closed, as illustrated in solid lines in FIG. 2, the shaft will be oriented as illustrated in FIGS. 3 and 4, with the bearing portions 42 of the spring biased against the side edge 32 of the cam portion of the shaft and the spring deflected from its relaxed position (see FIG. 8) to a slightly more flattened condition. The cam portion is at an angle to the spring in the closed position, as indicated in FIG. 4.

Figure 4A:
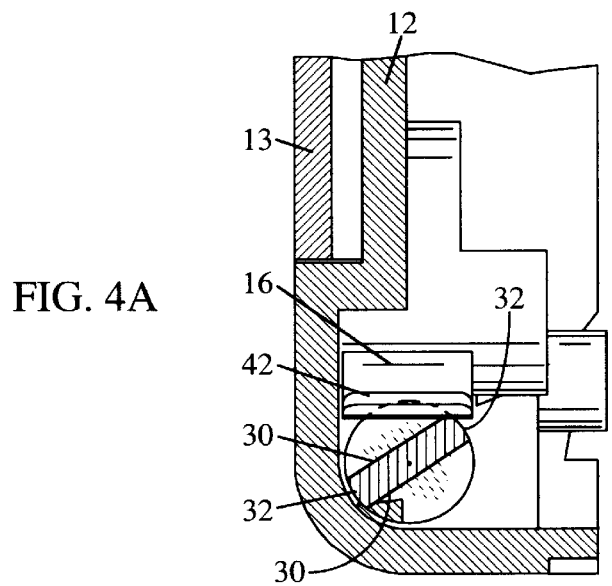
FIG. 4A is a further enlarged sectional view taken on line 4—4 of FIG. 3, with the cover closed.
Figure 4B:
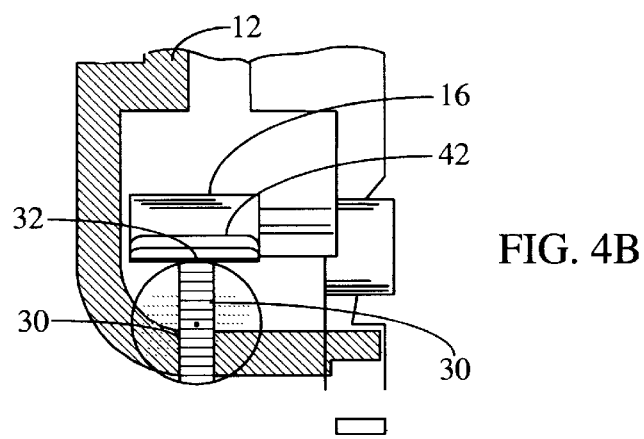
FIG. 4B is a view similar to FIG. 4A, showing a rotated position of the shaft in moving the cover from the closed position towards an open position.
Figure 6:
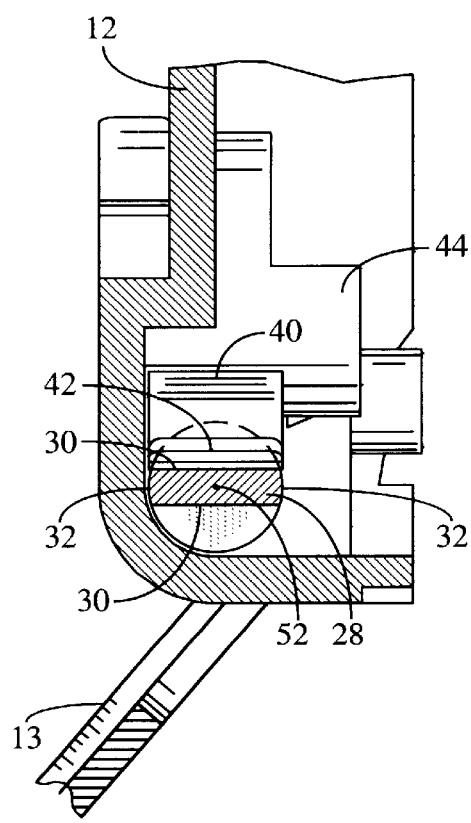
FIG. 6 is an enlarged sectional view taken on line 6—6 of FIG. 5.

As the cover is opened, the shaft is turned in a counter-clockwise direction as viewed in FIG. 4A, such that the side edge 32 rotates upwardly against the bearing portion 42, pushing the bearing portion upwardly away from the hinge shaft axis and further stressing the spring. Once the side edge 32 passes the center point or vertical position illustrated in FIG. 4B, the spring force will act to snap the shaft round to the open position of FIG. 6, where the bearing portions seat against the flat surfaces 30 of the respective cam portions, simultaneously moving the cover 13 into the open position illustrated in dotted outline in FIG. 2. The cover will thus be positively held in this position until the user wishes to close it, due to the bearing portions 42 of the spring acting against the flat surfaces of the cam portions, as illustrated in FIGS. 5 and 6.

When the user wishes to close the cover after using the phone, the cover is simply pushed back in the opposite direction (clockwise as viewed in FIGS. 2 and 6), simultaneously rotating the hinge shaft 14 back in the same direction. Referring to FIG. 6, this will rotate the left hand side edge 32 upwardly against the spring bearing portion 42, pushing the bearing portion 42 upwardly out of the way. Again, once the side edge 32 passes the central or upright position of FIG. 4B and starts to move away from portion 42, the spring will snap or force the shaft to continue its rotation until the cover is in the closed position of FIGS. 2 to 4, where no further rotation is possible. The bearing portions 42 of the spring again act on the flat surfaces 30 to hold the cover closed until the user positively pushes it open.

Repeated rotation of the plastic cam portions 28 against the metal spring bearing portions 42 can cause wear of the cam surfaces 30, 32, ultimately interfering with proper operation of the device. In view of this, caps or covers 18 are preferably slid over the working surfaces of the cam portions 30, 32. The caps 18 are of a harder material than the pivot shaft, such as copper or other metal or metal alloy.

Figure 9:
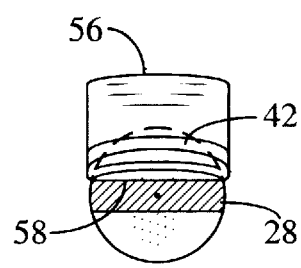
FIG. 9 is a view similar to a portion of FIG. 6, showing an alternative concave cross section spring.

FIG. 9 illustrates a modified spring 56. The spring 56 is identical in overall shape to that of the previous embodiment, and like reference numerals have been used as appropriate. However, the spring 16 of the previous embodiment had a substantially straight line vertical cross section, and the bearing portion 42 acting against the cam portion of the hinge shaft was substantially straight when viewed from one end of the spring as illustrated in FIGS. 4 and 6. In the modification of FIG. 9, bearing portion 42 has a concave face 58 facing the hinge shaft. This provides a more positive spring action.

The dimensions of the spring 16,56 and shaft 14 are dependent on the dimensions of the phone housing and cover in which they are to be installed. In one example, for a flip phone of dimensions around 14 cm. by 5 cm., the spring 16 had a length of the order of 21 mm. and a height of around 4 mm. The radius of each end bearing portion was around 0.49 mm., and the radius of each curved portion 40 and the central, anchored portion was around 5 to 6 mm. The flat surfaces of the cam portions each had a width of around 4 mm., while the side edges 32 had a width of around 1.5 mm. The optimum spring thickness to provide the desired snap action without producing too much wear on the cam surfaces is preferably in the range of 0.3 mm. to 0.5 mm. Other variables which may be adjusted according to snap action requirements are the spring material, spring geometry (stress concentration at bearing surface), and material heat treatment.

Figure 10:
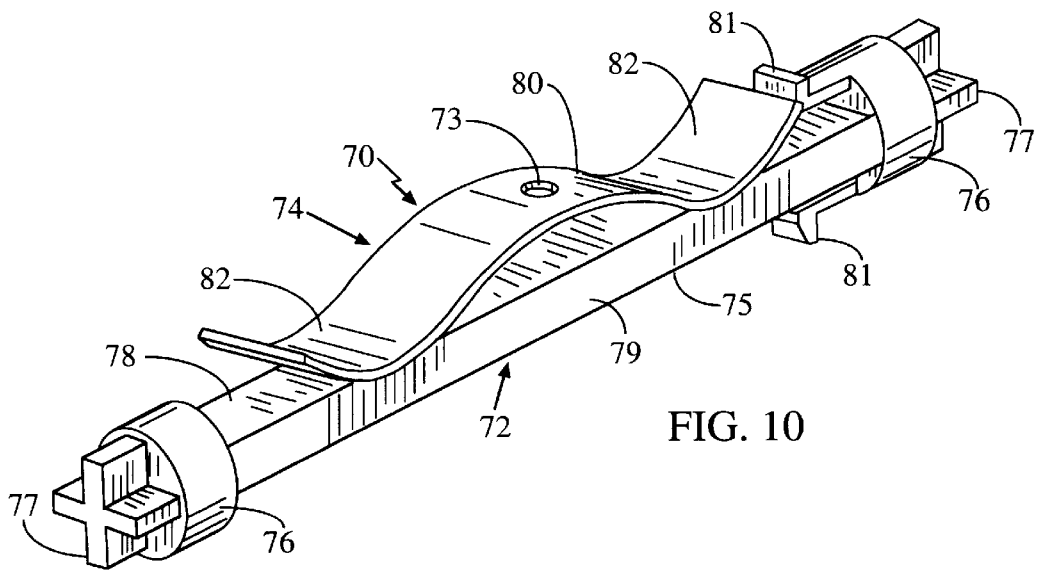
FIG. 10 is a perspective view of an alternative cam and spring configuration.
Figure 11:
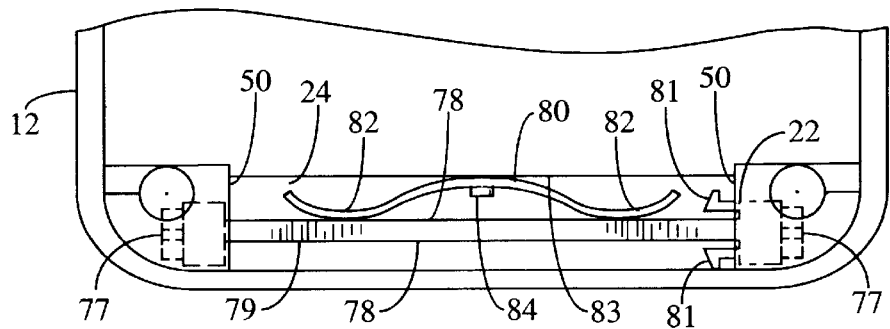
FIG. 11 is a view similar to FIG. 5, with the cam and spring of FIG. 10.

FIGS. 10 and 11 illustrate a snap hinge assembly 70 according to another embodiment of the invention, which operates in similar manner to the assembly of FIGS. 1 to 8. As in the previous embodiment, assembly 70 comprises a hinge shaft 72 and a spring 74. The hinge shaft has an elongate cam portion 75 with enlarged cylindrical end portions 76 for rotatably mounting in housing openings 22 as in the previous embodiment (see FIGS. 7 and 11). Cross-shaped key elements 77 extend outwardly from end portions 76 for keyed engagement in corresponding cross-shaped key slots (not illustrated) in the ears 40 of cover member 13, in a similar manner to the key tabs 26 and slots 48 of the previous embodiment. Alternatively, ears 40 may be provided with key projections 77 while the hinge pin is provided with matching key indents.

In this embodiment, a pair of opposing snap hook elements 81 project from one of the enlarged end portions 76 towards the opposite end of the shaft. These elements are compressed as the shaft is installed through the opening 22, and then snap outwardly as illustrated in FIG. 11 to hold the shaft in the housing and restrict axial movement of the shaft.

The cam portion 75 has opposing flat faces 78 and rounded side edges 79. The spring 74 is a spring metal strip of serpentine or undulating shape, having a central portion 80 curved in a first direction with the concave side facing towards the hinge shaft 72, and end bearing portions 82 curved in the opposite direction with the convex side facing towards, and bearing against, the cam portion 75. The hinge shaft is mounted in housing recess 24 by sliding it axially through one end wall 50 until the enlarged portions 76 are in rotating engagement in the respective openings 22 and the key elements 77 engage in corresponding key slots in the ears of the cover. The central portion 80 of the spring 74 has a fastener hole 73 (see FIG. 10) through which it is attached to a housing surface 83 by a bolt or rivet 84, as illustrated in FIG. 11, so that the bearing portions 82 bear against spaced positions on the cam portion 75 of the shaft.

Operation of the snap hinge assembly 70 of this embodiment is similar to the previous embodiment. As the cover and hinge shaft rotate in a first direction when the cover is opened, the cam portion rotates so that the side edge 79 moves up against the bearing portions 82 and pushes the bearing portions away from the cam shaft, tending to flatten and stress the spring, in a similar manner to that illustrated in FIGS. 3, 4A and 4B of the previous embodiment. When the edge 79 moves past the central point or upright orientation, the spring force will snap the shaft around and simultaneously rotate the cover into the open position, at which point the bearing portions act against one of the flat faces to hold the cover open. The opposite action occurs when the cover is closed, as described above in connection with the first embodiment (see FIGS. 3, 4A, 4B, and 6).

Figure 12:
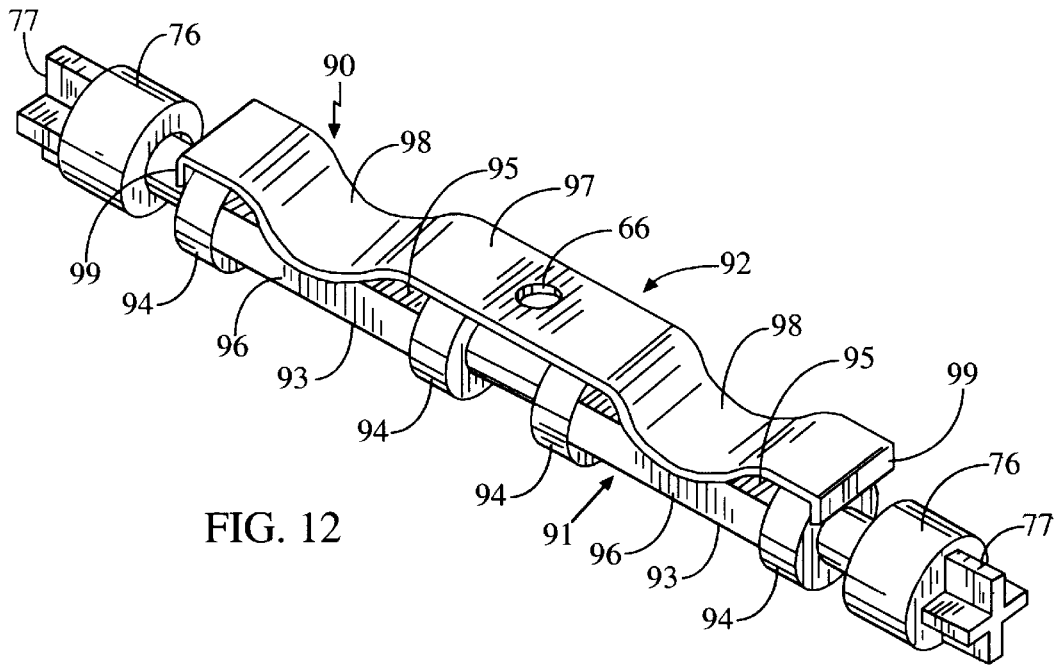
FIG. 12 is perspective view of a further cam and spring configuration.

FIG. 12 illustrates another modified snap hinge assembly 90 comprising a hinge shaft 91 and spring 92. The end portions 76 and key elements 77 are similar to the previous embodiment, and like reference numerals have been used as appropriate. The hinge shaft includes two spaced cam portions 93, each having an enlarged annular flange or boss 94 at each end. As in the previous embodiments, each cam portion 93 has opposing flat surfaces 95 and rounded side edges 96. The shaft will be mounted in a phone housing recess 24 exactly as described above in connection with the previous embodiments. The two innermost bosses 94 are relatively close together and add strength at the center of the hinge shaft.

The spring 92 is also modified in this embodiment. Spring 92 is a metal strip member having a generally flat central portion 97, curved bearing portions 98 for bearing against the respective cam portions 93, and a downturned lip 99 at each end for engagement over the outer end flanges 94 for resisting axial movement of the shaft, and centering the shaft in the housing recess. The flat central portion 97 has a central opening 66 for mounting the spring in the housing, in a similar manner to spring 74 of the previous embodiment.

In this embodiment, the spring 92 and opposing cam surfaces operate in a similar manner to the previous embodiments to snap and hold the cam shaft and attached cover in either the open or closed positions. Additionally, in this case, the spring also acts to center the shaft in the housing recess and restrict axial movement of the shaft. The closely spaced bosses or flanges 94 add strength to the shaft, and the bosses ride on the flattened portions of the spring as the shaft rotates.

The snap hinge assembly of this invention is easy to install in a portable phone or flip phone and is reliable and easy to operate. The assembly is significantly simpler than previous flip phone hinges, which involved several complex pieces of metal and plastic that had to be assembled accurately during manufacture. This invention involves only two parts, a hinge shaft and a spring, and these parts can be readily installed after manufacture of the phone housing and cover, reducing cost and simplifying assembly.

Although some preferred embodiments of the present invention have been described above by way of example only, it will be understood by those skilled in the field that modifications may be made to the disclosed embodiments without departing from the scope of the present invention, which is defined by the appended claims.

We claim:

1. A portable phone, comprising:
    a phone housing having a keypad and opposite first and second ends;
    a cover rotatably mounted at the first end of the housing for movement between opposite end positions, one of said end positions comprising a closed position covering at least part of the keypad and the other of said end positions comprising an open position of said cover; and
    a hinge assembly rotatably connecting the cover to the first end of the housing;
    the hinge assembly comprising a hinge pin rotatably mounted in the first end of the housing for rotation about a hinge axis, the hinge pin being secured to the cover, and a spring member secured in the first end of the housing and biased against the hinge pin;
    the hinge pin having a cam portion and the spring member having a bearing portion contacting the cam portion, wherein the spring member comprises a spring strip having at least one convex bearing portion bearing against the cam portion, the spring strip has a central portion secured to said housing and a pair of convex bearing portions, the hinge pin has a pair of spaced cam portions against which the respective bearing portions act, and a pair of enlarged flanges, the spring strip having end tabs for engagement over the respective flanges to restrict axial movement of the hinge pin; and the cam portion having a flat face against which the bearing portion acts in one of said end positions of the cover, the flat face having a first spacing from the hinge axis, and a side edge at one side of the flat face having a second spacing from the hinge axis greater than said first spacing, whereby rotation of the cover from said one end position towards the other end position rotates said side edge against said spring bearing portion to bias the spring member away from the hinge pin, and said spring bearing portion snaps said cover into the other end position when said side edge starts to rotate away from said spring bearing portion.

2. The phone as claimed in claim 1, wherein the cam portion has opposing flat faces.

3. The phone as claimed in claim 1, wherein the spring comprises a spring strip having a central portion anchored to the housing and first and second bearing portions acting against spaced cam portions on said hinge pin.

4. The phone as claimed in claim 3, wherein the hinge pin has two separate, spaced cam portions of identical shape.

5. The phone as claimed in claim 4, wherein the hinge pin has an enlarged annular flange at least at one end of each cam portion.

6. The phone as claimed in claim 5, wherein the hinge pin has enlarged annular flanges at opposite ends of each cam portion.

7. The phone as claimed in claim 1, wherein the housing has a recess for receiving said hinge pin, the recess having opposite end walls, each end wall having a through opening aligned with the opening in the opposite end wall, the hinge pin having end portions at each end for rotatable engagement in said end wall openings of said recess.

8. The phone as claimed in claim 7, wherein the cover has a pair of spaced ears for engagement over said recess end walls, each ear having a key recess aligned with the key recess in the opposite ear, the key recesses being aligned with said end wall openings, and the hinge pin has a key member extending from each end portion for keyed engagement in the key recess in the respective cover ear.

9. The phone as claimed in claim 7, including a pair of snap hooks projecting from at least one of said end portions towards the other end portion, the snap hooks comprising means for engaging over the inside of a respective end wall when said one end portion is rotatably engaged in the end wall opening to restrict axial movement of said hinge pin.

10. The phone as claimed in claim 1, wherein the strip has a thickness in the range from 0.3 mm. to 0.5 mm.

11. The phone as claimed in claim 1, including a protective cap for engagement over the cam portion to protect against wear.

12. A portable phone, comprising:

a phone housing having a keypad;

a cover rotatably mounted on the housing for rotation between an open position in which the keypad is uncovered and a closed position at least partially covering the keypad;

a hinge pin rotatably connecting the cover to the housing, the hinge pin has a cam portion for acting against a spring as the hinge pin is rotated back and forth between the open and closed positions, the cam portion having spaced first and second faces against which said spring acts in said open and closed positions, and a connecting surface extending between said first and second faces for resiliently stressing said spring as the hinge pin rotates back and forth, the spring comprising means for snapping said pin into the open and closed positions when said hinge pin is rotated a predetermined distance towards said open and closed position, respectively, the pin being secured to the cover and rotatably mounted in the housing; and the spring secured in the housing and biased against the hinge pin to releasably hold the hinge pin in first and second rotated positions corresponding to the open and closed positions of the cover, wherein the spring comprises a spring strip having at least one convex bearing portion bearing against the cam portion, the spring acting to urge the cover into the open position as the cover is rotated in a first direction and to urge the cover into the closed position as the cover is rotated in a second, opposite direction.

13. The phone as claimed in claim 12, wherein the hinge pin has a cam portion for acting against the spring as the hinge pin is rotated back and forth between the open and closed positions, the cam portion having spaced first and second faces against which said spring acts in said open and closed positions, and a connecting surface extending between said first and second faces for resiliently stressing said spring as the hinge pin rotates back and forth, the spring comprising means for snapping said pin into the open and closed positions when said hinge pin is rotated a predetermined distance towards said open and closed position, respectively.

14. The phone as claimed in claim 12, wherein the first and second faces of the cam portion comprise opposing flat faces.

15. The phone as claimed in claim 12, wherein the spring comprises a spring strip having a central portion anchored to the housing and first and second bearing portions acting against spaced cam portions on said hinge pin.

16. The phone as claimed in claim 15, wherein the hinge pin has two separate, spaced cam portions of identical shape.

17. The phone as claimed in claim 12, wherein the housing has a recess for receiving said hinge pin, the recess having opposite end walls, each end wall having a through opening aligned with the opening in the opposite end wall, the hinge pin having an end portion at each end for rotatable engagement in the respective end wall opening of said recess.

18. The phone as claimed in claim 17, wherein the cover has a pair of spaced ears for engagement over said recess end walls, each ear having a key recess aligned with the key recess in the opposite ear, the key recesses being aligned with said end wall openings, and the hinge pin has a key member extending from each end portion for keyed engagement in the key recess in the respective cover ear.

19. The phone as claimed in claim 12, wherein the strip has a thickness in the range from 0.3 mm. to 0.5 mm.

20. A snap hinge assembly for rotatably connecting a flip cover to a portable phone housing, the assembly comprising:

a hinge pin having opposite ends for rotatable engagement in opposing openings in spaced walls of a portable phone housing, each end of the hinge pin having an outer face with key formations for engagement with matching key formations in opposing faces of a pair of spaced ears on a portable phone cover, whereby the pin is rotatably mounted in the housing and secured for rotation with the cover as the cover is opened and closed;

the hinge pin having at least one cam portion between said opposite ends;

a spring having a first portion for anchoring in a portable phone housing adjacent the hinge pin and a second, bearing portion for bearing against the cam portion of the hinge pin as the pin rotates with the cover, the spring comprises a resilient strip having a central portion for anchoring in the housing and opposite, arcuate bearing portions for bearing against the hinge pin, the hinge pin having spaced cam portions for engaging the respective arcuate bearing portions of the spring, wherein the spring comprises a resilient strip having a central portion for anchoring in the housing and opposite, arcuate bearing portions for bearing against the hinge pin, the hinge pin having spaced cam portions for engaging the respective arcuate bearing portions of the spring; and the spring and cam portion together comprising means for snapping the cover into the open and closed positions, respectively, when the cover is rotated a predetermined distance towards the respective open and closed positions, and further comprising means for releasably holding the cover in the respective open and closed positions.

21. The assembly as claimed in claim 20, wherein the strip has a thickness in the range from 0.3 mm. to 0.5 mm.

22. The assembly as claimed in claim 20, wherein each cam portion has opposing flat surfaces for engaging the respective bearing portions of the spring in the open and closed positions, and an edge portion extending between the flat surfaces for biasing the bearing portions away from the hinge pin as the cover is rotated back and forth between the open and closed positions.

* * * * *